United States Patent
Yamano et al.

(10) Patent No.: US 10,670,919 B2
(45) Date of Patent: Jun. 2, 2020

(54) BACKLIGHT DEVICE AND LIQUID-CRYSTAL DISPLAY DEVICE

(71) Applicant: Panasonic Intellectual Property Management Co., Ltd., Osaka (JP)

(72) Inventors: Yoshikazu Yamano, Osaka (JP); Hisanori Sasaki, Miyagi (JP); Yasuhiro Kumamoto, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/847,564

(22) Filed: Dec. 19, 2017

(65) Prior Publication Data

US 2018/0107067 A1 Apr. 19, 2018

Related U.S. Application Data

(63) Continuation of application No. PCT/JP2016/002713, filed on Jun. 6, 2016.

(30) Foreign Application Priority Data

Jul. 1, 2015 (JP) ................... 2015-132280

(51) Int. Cl.
*F21S 2/00* (2016.01)
*G02F 1/13357* (2006.01)

(52) U.S. Cl.
CPC .......... *G02F 1/133611* (2013.01); *F21S 2/00* (2013.01); *G02F 1/133603* (2013.01);
(Continued)

(58) Field of Classification Search
CPC ................ G02F 1/133608; G02F 1/133611
See application file for complete search history.

(56) References Cited

U.S. PATENT DOCUMENTS

2006/0104080 A1* 5/2006 Kim ................ G02F 1/133608
362/555
2007/0103908 A1 5/2007 Tabito et al.
(Continued)

FOREIGN PATENT DOCUMENTS

EP 2876490 A1 5/2015
JP 2002-099250 A 4/2002
(Continued)

OTHER PUBLICATIONS

The Extended European Search Report dated Jun. 20, 2018 for the related European Patent Application No. 16817419.1.
(Continued)

*Primary Examiner* — Michael H Caley
*Assistant Examiner* — Jonathan Y Jung
(74) *Attorney, Agent, or Firm* — McDermott Will & Emery LLP

(57) ABSTRACT

A backlight device includes a plurality of light sources arranged in a shape of a matrix, a reflective sheet having partition walls arranged to surround each of the plurality of light sources in four directions and reflecting light emitted from the plurality of light sources, a luminance uniformity plate located above the reflective sheet and uniforming luminance of the light emitted from the plurality of light sources and light reflected by the reflective sheet, and a support member supporting the luminance uniformity plate. The reflective sheet has an opening portion in a portion, of at least one partition wall of the partition walls arranged in the four directions, which is other than four corners, and the support member has a shield portion disposed in the opening portion and shielding the opening portion.

6 Claims, 8 Drawing Sheets

(52) U.S. Cl.
CPC .. *G02F 1/133605* (2013.01); *G02F 1/133606* (2013.01); *G02F 1/133608* (2013.01)

(56) References Cited

U.S. PATENT DOCUMENTS

| | | | |
|---|---|---|---|
| 2009/0185104 A1 | 7/2009 | Watanabe | |
| 2009/0231835 A1 | 9/2009 | Roberts et al. | |
| 2010/0141867 A1* | 6/2010 | Ogihara | G02F 1/133605 349/61 |
| 2010/0165472 A1* | 7/2010 | Hamasaki | B32B 27/32 359/627 |
| 2012/0268688 A1 | 10/2012 | Sato et al. | |
| 2013/0128128 A1* | 5/2013 | Ikuta | F21V 7/0066 348/790 |
| 2013/0194529 A1* | 8/2013 | Chang | G02F 1/133608 349/58 |
| 2015/0055052 A1* | 2/2015 | Tanabe | G02F 1/133504 349/58 |
| 2018/0252966 A1* | 9/2018 | Kumamoto | G02F 1/133603 |

FOREIGN PATENT DOCUMENTS

| | | |
|---|---|---|
| JP | 2006-208466 A | 8/2006 |
| JP | 2009-140720 A | 6/2009 |
| JP | 2009-169324 A | 7/2009 |
| JP | 2010-135204 A | 6/2010 |
| JP | 2011-151002 A | 8/2011 |

OTHER PUBLICATIONS

Communication pursuant to Article 94(3) EPC dated Jul. 24, 2019 issued in corresponding European Patent Application No. 16817419.1.

* cited by examiner

BACKLIGHT DEVICE AND LIQUID-CRYSTAL DISPLAY DEVICE

CROSS-REFERENCE TO RELATED APPLICATIONS

This application is a continuation of the PCT International Application No. PCT/JP2016/002713 filed on Jun. 6, 2016, which claims the benefit of foreign priority of Japanese patent application No. 2015-132280 filed on Jul. 1, 2015, the contents all of which are incorporated herein by reference.

DESCRIPTION

Technical Field

The present disclosure relates to a backlight device including a plurality of light sources and a liquid crystal display device including the backlight device.

Background Art

Liquid crystal display devices have advantages such as low profile, low power consumption, and high definition, and have proliferated in the TV field along with an increase in screen size owing to the advancement of manufacturing techniques. It has been pointed out that an image displayed on a liquid crystal display device is low in contrast feeling (narrow in dynamic range) due to the display method in use. For this reason, in recent years, many efforts have been made on development of techniques associated with improvement in image quality of display images.

PTL 1 discloses a direct backlight having a plurality of light sources (cold cathode fluorescent tubes 101) partitioned from each other, for each illumination region, by partition walls 102, as shown in FIG. 9. White light emitting diodes (LEDs, not shown) for luminance adjustment are arranged below the light sources. PTL 1 describes that a lens, diffuser panel, and optical sheet (not shown) are provided on each LED to increase a luminance ratio of illumination light between the adjacent illumination regions, that is, a dynamic range. PTL 1 also describes that partitioning the respective illumination regions by using partition walls 102 can prevent mutual interference between illumination light at the adjacent illumination regions, thereby obtaining an image with higher quality.

CITATION LIST

Patent Literature

PTL 1: Unexamined Japanese Patent Publication No. 2002-99250

SUMMARY OF THE INVENTION

The conventional liquid crystal display device has a problem that neighboring areas above partition walls 102 become dark because partition walls 102 block illumination light between the adjacent illumination regions. In addition, lenses arranged on the LEDs make it difficult to reduce a thickness of the device.

It is an object of the present disclosure to provide a liquid crystal display device that can make a luminance distribution constant by reducing luminance unevenness while achieving a reduction in thickness.

A backlight device according to the present disclosure includes a plurality of light sources arranged in a shape of a matrix, a reflective sheet having partition walls arranged to surround each of the plurality of light sources in four directions and reflecting light emitted from the plurality of light sources, a luminance uniformity plate located above the reflective sheet and uniforming luminance of the light emitted from the plurality of light sources and light reflected by the reflective sheet, and support members supporting the luminance uniformity plate. The reflective sheet includes an opening portion in a portion, of at least one partition wall of the partition walls arranged in the four directions, which is other than four corners, the opening portion being for placement of support members that support the luminance uniformity plate, and the support member includes a shield portion disposed in the opening portion and shielding the opening portion.

Other backlight device according to the present disclosure includes a plurality of light sources arranged in a shape of a matrix, a reflective sheet having partition walls arranged to surround each of the plurality of light sources in four directions and reflecting light emitted from the plurality of light sources, and a luminance uniformity plate located above the reflective sheet and uniforming luminance of the light emitted from the plurality of light sources and light reflected by the reflective sheet. The reflective sheet includes support portions located on an upper portion, of at least one partition wall of the partition walls arranged in the four directions, which is other than four corners, and supporting the luminance uniformity plate.

The liquid crystal display device according to the present disclosure is effective in obtaining a liquid crystal display device that can make a luminance distribution constant by reducing luminance unevenness while achieving a reduction in thickness.

DESCRIPTION OF EMBODIMENTS

Hereinafter, exemplary embodiments will be described in detail with reference to the drawings as appropriate. However, descriptions in more detail than necessary may be omitted. For example, a detailed description of a matter which is already well-known, or an overlapped description for a substantially identical configuration may be omitted. This is to avoid unnecessary redundancy of the following description and facilitate the understanding of one skilled in the art.

Here, the applicant provides the attached drawings and the following description such that one skilled in the art can sufficiently understand the present disclosure, and therefore, they do not intend to restrict the subject matters of claims.

First Exemplary Embodiment

Figure 1:
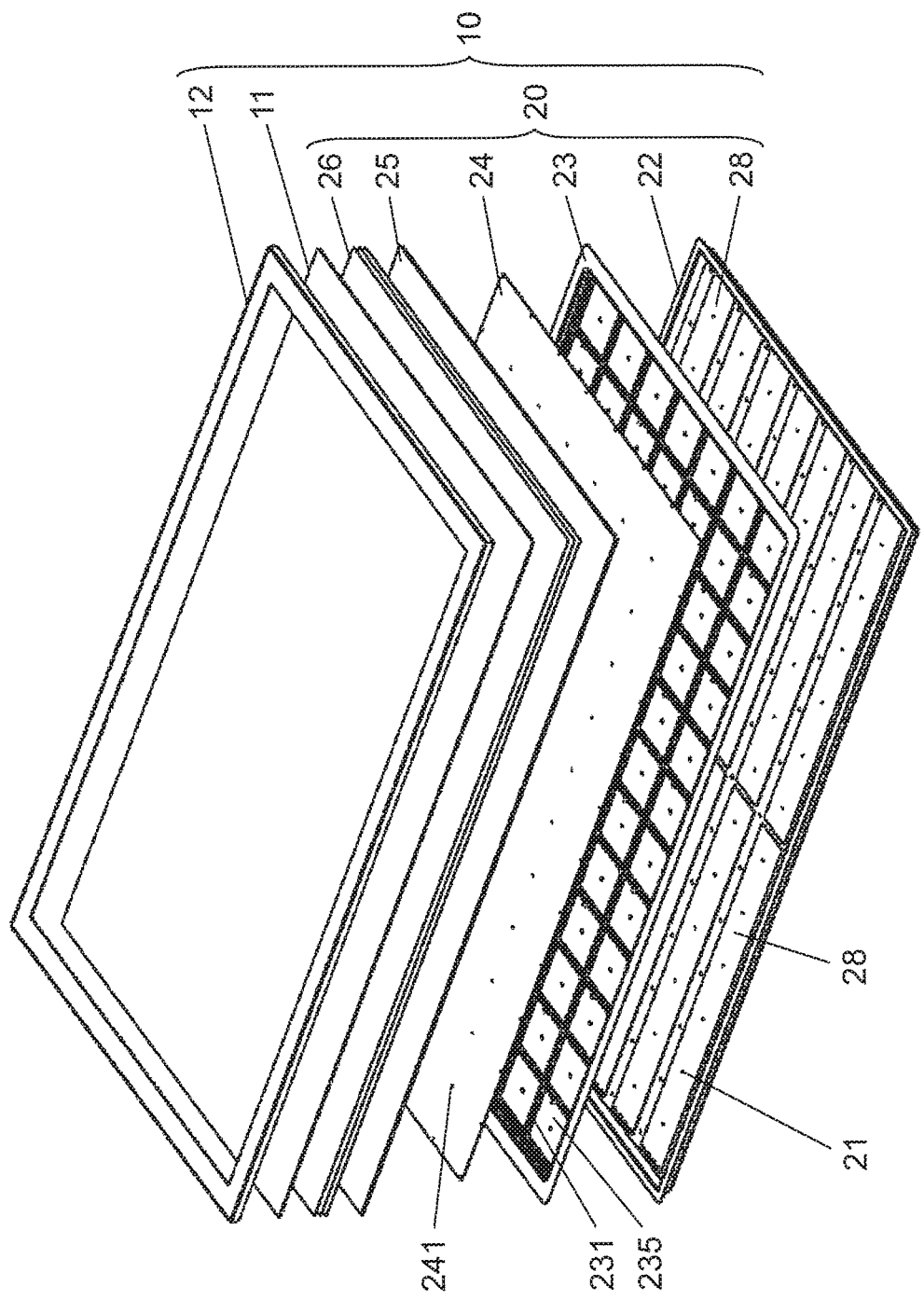
FIG. 1 is an exploded perspective view showing a schematic arrangement of an overall liquid crystal display device according to a first exemplary embodiment.
Figure 2:
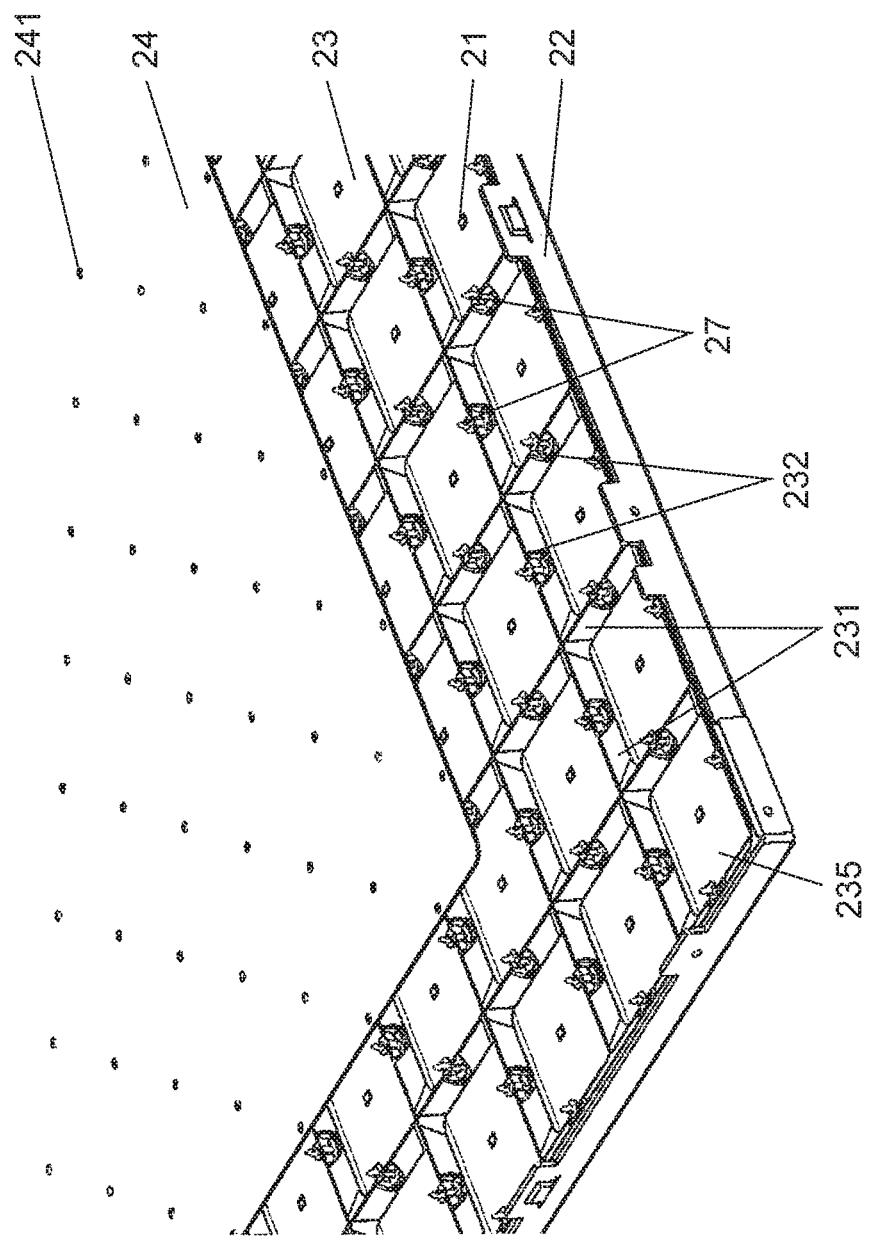
FIG. 2 is an exploded perspective view showing an enlarged view of part of the liquid crystal display device according to the first exemplary embodiment.

A first exemplary embodiment will be described below with reference to FIGS. 1 to 7. FIG. 1 is an exploded perspective view showing a schematic arrangement of an overall liquid crystal display device, and FIG. 2 is an exploded perspective view showing an enlarged view of part of the liquid crystal display device.

[1-1. Arrangement]

[1-1-1. Arrangement of Liquid Crystal Display Device]

As shown FIG. 1, liquid crystal display device 10 is configured including bezel 12, transmissive liquid crystal panel 11 in a shape of a rectangular flat plate, and backlight device 20 that is disposed on a back side of liquid crystal panel 11 and has a rectangular parallelepiped shape with a size corresponding to liquid crystal panel 11.

Liquid crystal panel 11 is disposed to transmit light emitted from backlight device 20.

Bezel 12 also serves as a front casing of liquid crystal display device 10. A plastic resin is mainly used as a material for bezel 12 from a viewpoint of design, lightweightness, and the like of a product.

[1-1-2. Arrangement of Backlight Device]

Backlight device 20 is configured including a plurality of printed boards 28 on which a plurality of light sources 21 are mounted, chassis 22 housing the plurality of printed boards 28, optical element 26, diffuser panel 25, luminance uniformity plate 24, and reflective sheet 23. Optical element 26, diffuser panel 25, luminance uniformity plate 24, and reflective sheet 23 are disposed between liquid crystal panel 11 and light sources 21.

Printed board 28 has an approximately rectangular shape and supplies power for driving light sources 21. Printed board 28 according to the present disclosure is equipped with six light sources 21 in a line. As shown in FIG. 1, each printed board 28 is arranged in 7 rows×2 columns in chassis 22. That is, the plurality of light sources 21 are arranged in a shape of a matrix. Note that a shape, size, number, and placement of printed boards 28 and a number of light sources 21 to be mounted are irrelevant to the gist of the present disclosure, and hence are not specifically limited.

Light sources 21 may include a plurality of light sources that emit monochrome light such as red light, blue light, and green light. Alternatively, light sources 21 may include only light sources that emit white light. As light source 21, an LED or the like may be used.

Chassis 22 also serves itself as a back casing of liquid crystal display device 10. Chassis 22 is made of a plastic resin, a metal having highly emissive ceramic sheets bonded to its obverse and reverse surfaces, a metal having undergone a black alumite treatment or the like, or a metal coated with carbon black. As the above metal, for example, an alloy containing aluminum, iron, or the like as a main constituent is used.

Reflective sheet 23 is disposed so as to surround each light source 21, and reflects the light emitted from each light source 21 in a direction of luminance uniformity plate 24. Partition walls 231 in a shape of a matrix surrounding respective light sources 21 are formed on reflective sheet 23. In the present disclosure, a region obtained by surrounding light source 21 with partition walls 231 in four directions will be referred to as light-emitting region 235. Reflective sheet 23 is provided with a mirror or white surface to efficiently reflect the light emitted from light sources 21. Note that in backlight device 20 according to the present disclosure, a pitch between light-emitting regions 235 (a length of one side of a matrix) is set to 50 mm.

In addition, as shown in FIG. 2, opening portion 232 is formed in each partition wall 231, and support member 27 is disposed in opening portion 232. Support members 27, each having a light reflecting function, support luminance uniformity plate 24 and diffuser panel 25. Support members 27 are formed by, for example, mold injection by using highly reflective members such as polycarbonate members.

Luminance uniformity plate 24 is disposed on an upper surface of reflective sheet 23, and causes the light emitted from light source 21 and light reflected by reflective sheet 23 to exit upon uniforming luminance of the light. Luminance uniformity plate 24 has a plurality of holes 241 for attachment of support members 27. Hole 241 has a size large enough to allow an upper portion of support member 27 to pass through. In addition, luminance uniformity plate 24 has a plurality of holes (not shown) corresponding to light distribution of light sources 21 in each light-emitting region 235. In light-emitting region 235, because luminance increases with a decrease in distance to light source 21, hole is provided, with its size becoming smaller with a decrease in distance to light source 21. Forming holes in this manner can uniform luminance. Luminance uniformity plate 24 is formed from, for example, highly reflective PET.

Diffuser panel 25 is disposed on an upper surface of luminance uniformity plate 24, and diffuses light exiting from luminance uniformity plate 24. Support members 27 support diffuser panel 25. Diffuser panel 25 is formed from, for example, an acrylic resin plate member, more specifically, a translucent resin plate member dispersed with microparticles to diffuse light incident from one surface and cause the light to exit from the other surface. In addition, diffuser panel 25 may be formed by mold injection or the like by using a known transparent resin, such as polymethylmethacrylate or polycarbonate, which has a higher refractive index than air.

Optical element 26 is disposed on diffuser panel 25, and further diffuses and collects light exiting from the diffuser panel 25. Optical element 26 includes an optical sheet-laminated member with a size corresponding to liquid crystal panel 11. This optical sheet-laminated member is formed from, for example, a prism sheet that collects light incident from diffuser panel 25 toward liquid crystal panel 11 located ahead, a diffuser sheet that further diffuses light incident from diffuser panel 25, a polarizing sheet that transmits light having a specific polarization plane so as to make a polarization plane of light incident from diffuser panel 25 correspond to a polarization plane of liquid crystal panel 11, or the like. Light passing through optical element 26 is diffused to provide a more uniform surface light source.

[1-1-3. Reflective Sheet]

Figure 3:
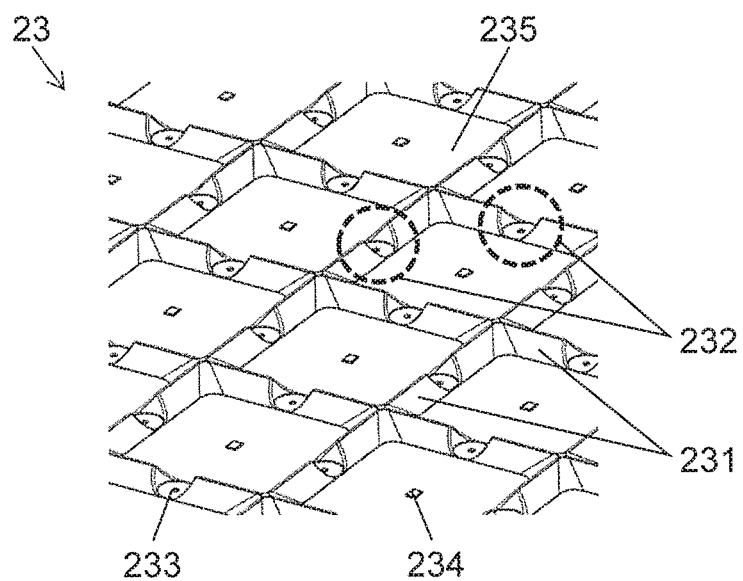
FIG. 3 is a partially enlarged view of a reflective sheet according to the first exemplary embodiment.

FIG. 3 is a partially enlarged view of reflective sheet 23. Partition walls 231 in a shape of a matrix are formed on reflective sheet 23 to surround each light source 21 in four directions. In other words, partition walls 231 partition backlight device 20 into a plurality of light-emitting regions 235 in a shape of a matrix. In addition, as shown in FIG. 3, opening portion 232 is provided in a center portion of each partition wall 231. That is, opening portion 232 is provided in a portion where a straight line connecting light sources 21 adjacent to each other intersects a partition wall 231. Note that each opening portion 232 need not always be provided in a center portion of a corresponding one of partition walls 231, and may be provided in a portion other than four corners of light-emitting region 235. In addition, opening portions 232 need not always be provided in all partition walls 231, and may be provided in at least one partition wall 231 of partition walls 231 in four directions, which partition light-emitting region 235. In this case, four corners indicate regions where partition walls 231 intersect each other. In this case, partition wall 231 in the present disclosure has a height of 4.5 mm.

Opening portions 232 are provided for placement of support members 27 that support luminance uniformity plate 24 disposed above. Opening portions 232 have holes 233 into which support members 27 are inserted. Note that positions of holes 241 provided in luminance uniformity plate 24 are determined in accordance with positions of holes 233 of opening portions 232.

In addition, as shown in FIG. 3, opening 234 is provided in a central portion of light-emitting region 235 of reflective sheet 23. Opening 234 is provided to expose light source 21 to a surface of reflective sheet 23.

[1-1-4. Support Member]

Figure 4:
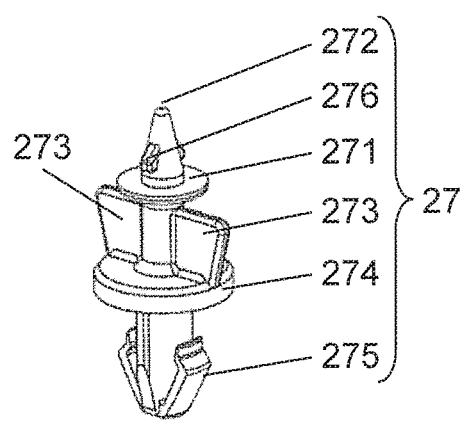
FIG. 4 is a figure showing a detailed arrangement of a support member according to the first exemplary embodiment.
Figure 5:
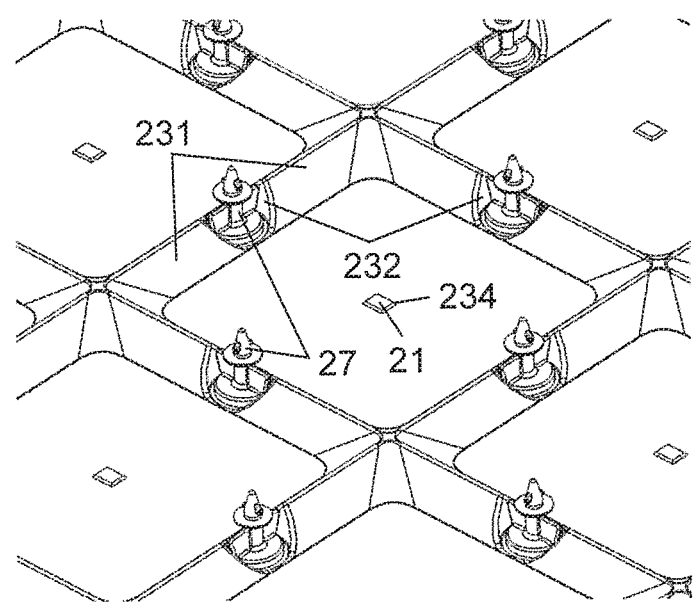
FIG. 5 is a figure for explaining a state in which support members are attached to the reflective sheet according to the first exemplary embodiment.
Figure 6:
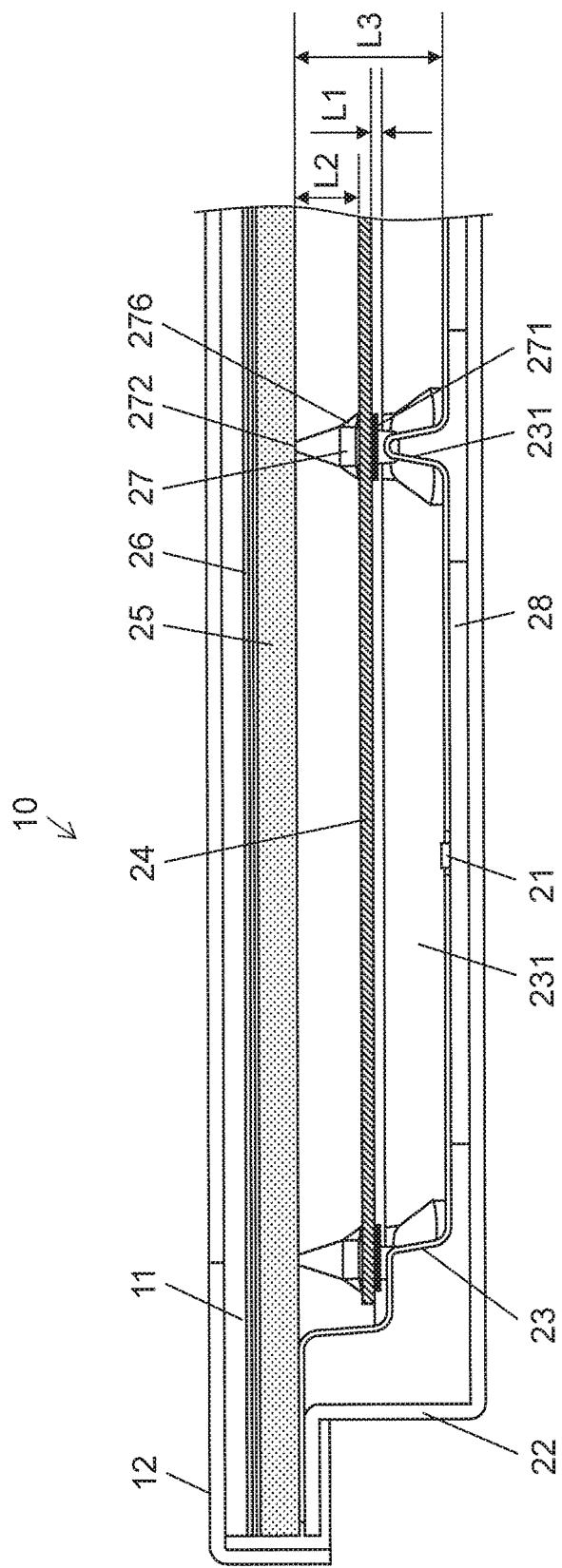
FIG. 6 is a figure for explaining an internal arrangement of the liquid crystal display device according to the first exemplary embodiment.

FIG. 4 is a figure showing a detailed arrangement of support member 27. FIG. 5 is a figure for explaining a state in which support members 27 are attached to reflective sheet 23. FIG. 6 is a figure for explaining an internal arrangement of liquid crystal display device 10.

As shown in FIG. 4, support member 27 includes first support portion 271, second support portion 272, two shield portions 273, fixing portion 274, snap fit 275, and fixing portion 276.

Snap fit 275 is inserted into hole 233 formed in opening portion 232 of partition wall 231. When support member 27 is inserted into hole 233 of opening portion 232, fixing portion 274 locks movement of support member 27 in a direction of hole 233.

In this case, holes (not shown) are formed in chassis 22 at positions corresponding to holes 233 of respective opening portions 232. Each of snap fits 275 is also inserted into the respective holes of chassis 22, and a part of each snap fit 275 is locked while penetrating through each of the holes of chassis 22. This causes reflective sheet 23, printed hoard 28, and chassis 22 to be in a state of being caught between fixing portions 274 and snap fits 275.

When support member 27 is placed in opening portion 232 of partition. wall 231, shield portions 273 shield opening portion 232. When support members 27 are arranged in opening portions 232 shown in FIG. 3, as shown in FIG. 5, two shield portions 273 of each support member 27 shield each of opening portions 232. That is, shield portion 273 is formed in a shape shielding opening portion 232 so as to compensate for part of partition wall 231. An upper end of shield portion 273 is set almost flush with partition wall 231, and a side surface of shield portion 273 has a shape conforming to a shape of a side surface of opening portion 232.

First support portion 271 is formed in a shape of a flat plate on shield portion 273, as shown in FIG. 4, and supports luminance uniformity plate 24, as shown in FIG. 6. In the present disclosure, first support portion 271 is formed in a circular shape, but the present disclosure is not limited to this. First support portion 271 may have any flat surface shape that is larger than hole 241 of luminance uniformity plate 24 and can horizontally support luminance uniformity plate 24.

As shown in FIG. 6, fixing portion 276 nips luminance uniformity plate 24 together with first support portion 271. This can fix luminance uniformity plate 24.

Second support portion 272 is formed on a distal end of support member 27, and supports diffuser panel 25 with a small area. Second support portion 272 may have either a flat surface shape or a curved surface shape.

In this case, as shown in FIG. 6, gap L1 is a gap between luminance uniformity plate 24 and an upper end of partition wall 231, gap L2 is a gap between diffuser panel 25 and luminance uniformity plate 24, and optical distance L3 is an optical distance defined by a distance between diffuser panel 25 and reflective sheet 23. That is, optical distance L3 is a distance between a lower surface of diffuser panel 25 and an upper surface of light-emitting region 235 of reflective sheet 23. In the present disclosure, gap L1 is preferably set to 5% to 30% of optical distance L3. This setting makes it possible to reduce luminance unevenness at those portions of luminance uniformity plate 24 which are located above partition walls 231 while minimizing leakage of light to adjacent light-emitting regions 235. In addition, gap L2 is preferably set to not greater than 50% of optical distance L3. Gap L2 is more preferably set to 30% to 50% of optical distance L3. This can reduce luminance unevenness.

[1-2. Operation]

Figure 7:
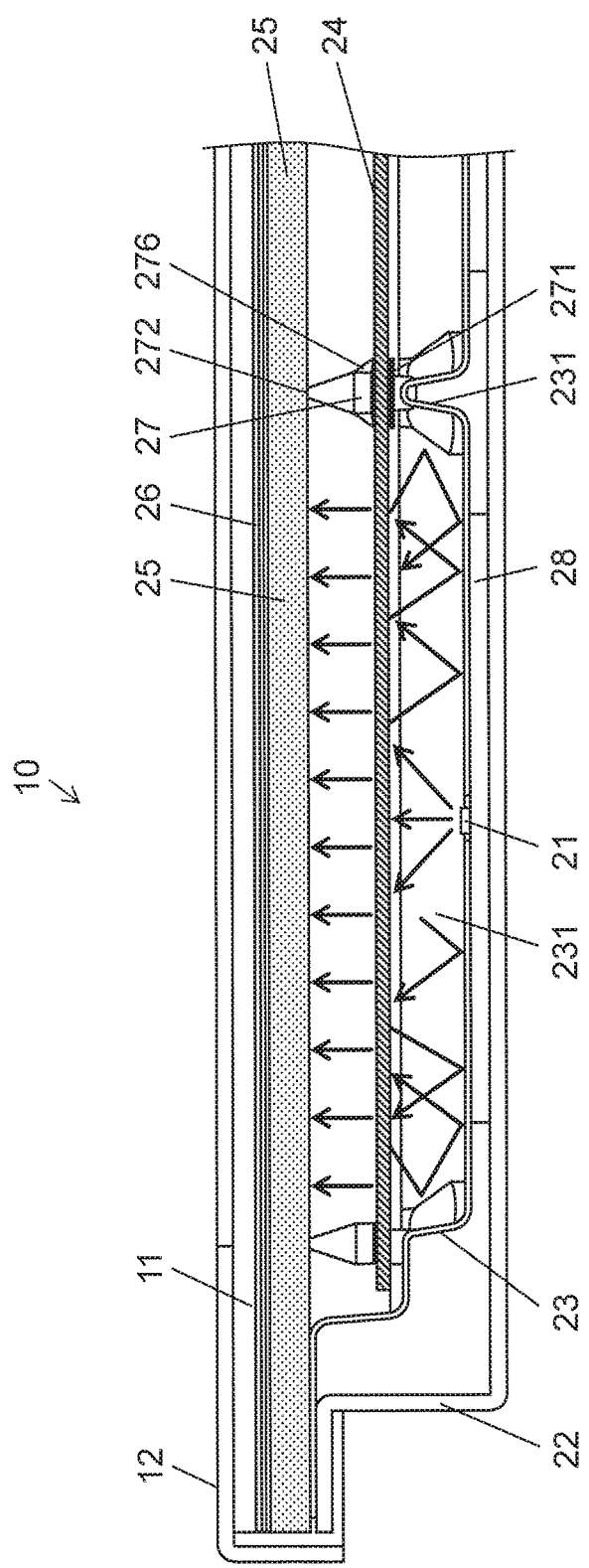
FIG. 7 is a figure for explaining an example of state of light transmission according to the first exemplary embodiment.

An operation of liquid crystal display device 10 having the above arrangement will be described below. FIG. 7 is a figure for explaining an example of state of light transmission in liquid crystal display device 10.

Each light source 21 is independently controlled to be turned on or off. When light source 21 is turned on, the light emitted from light source 21 enters luminance uniformity plate 24, together with indirect light reflected by surrounding partition walls 231 and reflective sheet 23. As shown in FIG. 7, providing partition walls 231 around each light source 21 makes it possible to reduce mutual interference of the light emitted from light sources 21 between light-emitting regions 235.

Because an intensity of a luminous flux is inversely proportional to the square of a distance, large reductions in luminance occur at the four corners of partition walls 231, to which distances from light source 21 are largest. If support members 27 are provided at the four corners of partition walls 231, further reductions in luminance occur because luminance decreases near the four corners, and in addition to that, support members 27 block transmission of light. For this reason, in the present disclosure, support members 27 are provided at portions other than the four corners of partition walls 231.

In the present disclosure, opening portion 232 is provided in a substantially center portion of partition wall 231, to which a distance from light source 21 is smallest and at which a reduction in luminance is small, and support member 27 is placed in the center portion. Because the center portion is located at a position where luminance is highest, the influence of a reduction in luminance caused by blocking of transmission of light by support member 27 is low.

In addition, as shown in FIG. 6, support members 27 form gap L1 between partition walls 231 and luminance uniformity plate 24, and spaces of gap L1 are also formed above the four corners. In these spaces, the light emitted from light sources 21 in adjacent light-emission regions mixes with each other and strikes luminance uniformity plate 24. That is, this can reduce luminance unevenness at the four corners when both adjacent light-emitting regions 235 are on.

Such an arrangement of support members 27 can minimize luminance unevenness on partition walls 231 which is caused by placement of support members 27.

Luminance uniformity plate 24 causes incident light to exit upon uniforming its luminance. Light exiting from luminance uniformity plate 24 strikes diffuser panel 25. Diffuser panel 25 diffuses the incident light and causes it to exit. The light exiting from diffuser panel 25 strikes optical element 26 and is further diffused and collected to irradiate liquid crystal panel 11.

[1-3. Effects and Like]

As described above, the backlight device according to this exemplary embodiment includes the plurality of light sources arranged in a shape of a matrix, the reflective sheet that has the partition walls arranged to surround each of the plurality of light sources in four directions and reflects light emitted from the plurality of light sources, the luminance uniformity plate that is located above the reflective sheet and uniforms luminance of the light emitted from the plurality of light sources and light reflected by the reflective sheet, and the support member that supports the luminance uniformity plate. The reflective sheet has the opening portion in a portion, of at least one partition wall of the partition walls arranged in the four directions, which is other than the four corners, and the support member has the shield portion that is disposed in the opening portion and shields the opening portion.

This makes it possible to minimize the leakage of light from each light source 21 to the outside of respective light-emitting regions 235. That is, this can reduce mutual interference of the light emitted from adjacent light sources 21.

In addition, each support member 27 is disposed in a substantially center portion of each partition wall 231 to which a distance from light source 21 is smallest. This can prevent occurrence of luminance unevenness, caused when support member 27 shields luminous flux, at portion, of luminance uniformity plate 24, which is located above partition wall 231.

Support member 27 has shield portion 273, and hence can shield opening portion 232 of partition wall 231, thereby minimizing the leakage of luminous flux from opening portion 232 to adjacent light-emitting region 235.

Supporting luminance uniformity plate 24 by using the plurality of support members 27 can maintain the distance between luminance uniformity plate 24 and partition wall 231 constant. This makes it possible to keep a luminance distribution constant.

As described above, backlight device 20 according to the present disclosure can improve the contrast of liquid crystal panel 11. Furthermore, arranging no lens on the LED makes it possible to achieve a reduction in thickness.

Second Exemplary Embodiment

A second exemplary embodiment will exemplify an arrangement in which support members 27 and reflective sheet 23 (partition walls 231) in the first exemplary embodiment are integrally formed. Because other arrangements are the same as those in the first exemplary embodiment, a repetitive description of them will be omitted.

Figure 8:
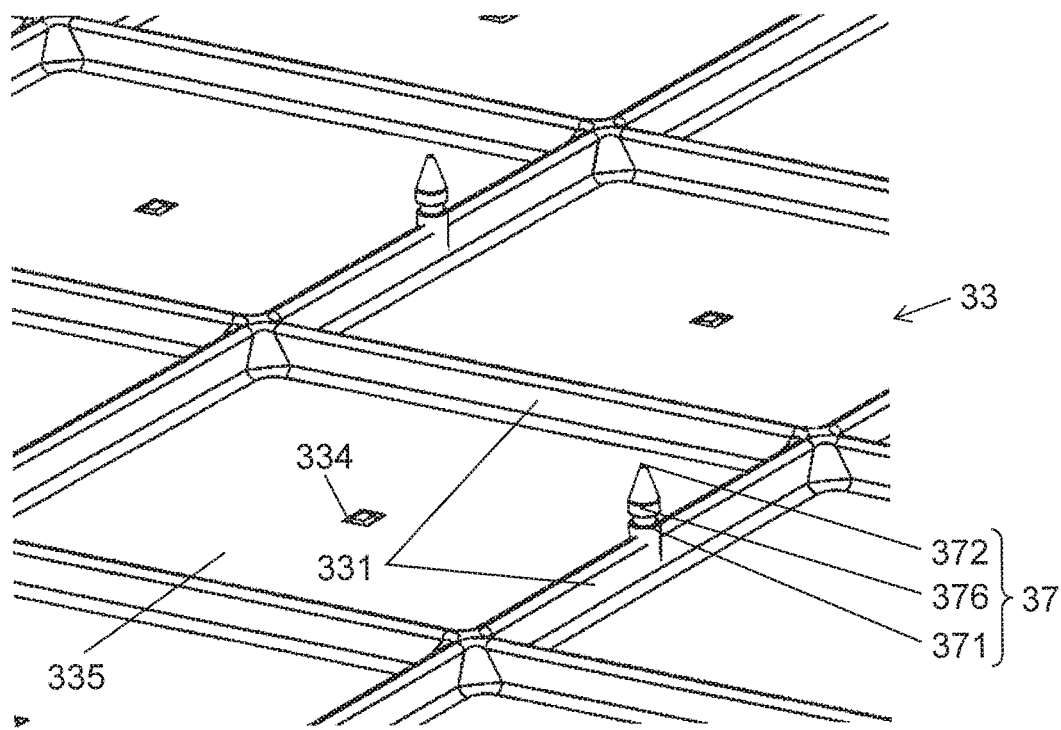
FIG. 8 is a partially enlarged figure of a reflective sheet according to a second exemplary embodiment.
Figure 9:
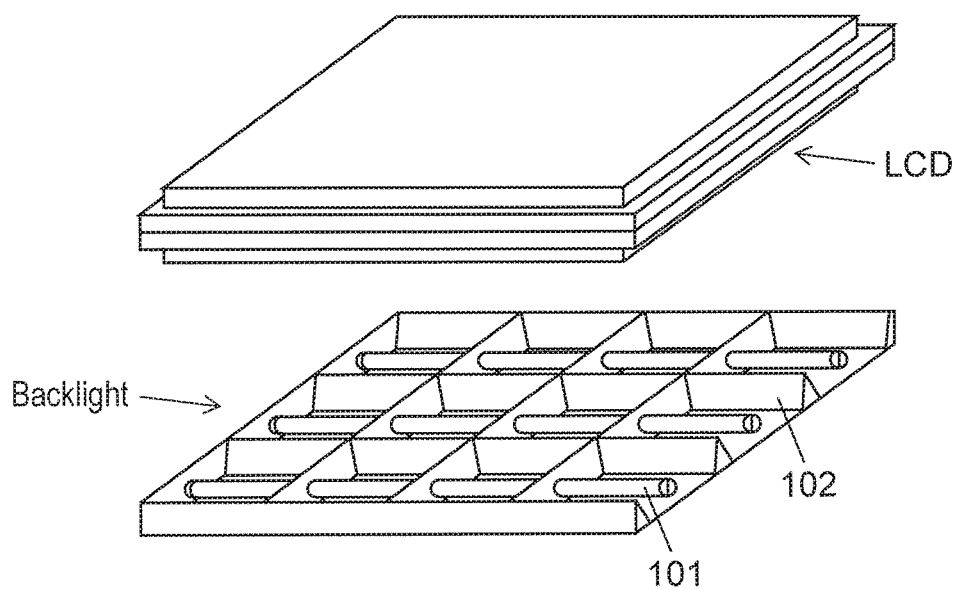
FIG. 9 is a figure schematically showing an arrangement of a conventional display device.

FIG. 8 is a partially enlarged view of reflective sheet 33 according to the second exemplary embodiment of the present disclosure. As shown in FIG. 8, reflective sheet 33 includes openings 334, partition walls 331, and support portions 37. Openings 334 are provided to expose light sources 21 to a surface of reflective sheet 33. Partition walls 331 are formed to surround opening 334 in four directions while opening 334 is located in a central portion. As in the first exemplary embodiment, partition walls 331 surround opening 334 (light source 21) in four directions to form light-emitting region 335. As shown in FIG. 8, support portions 37 are provided on upper center portions of several partition walls 331. In other words, support portion 37 is located on an upper portion, of partition wall 331, at which a straight line connecting openings 334 (light sources 21) adjacent to each other intersects partition wall 331.

Support portion 37 includes first support portion 371, second support portion 372, and fixing portion 376. First support portion 371 supports luminance uniformity plate 24 located above reflective sheet 33. Fixing portion 376 nips luminance uniformity plate 24 together with first support portion 371 to fix luminance uniformity plate 24. Second support portion 372 is formed on a distal end of support portion 37 and supports diffuser panel 25.

Integrally forming support portions 37 and partition walls 331 in this manner eliminates the need to provide opening portions in partition walls 331 and use support members. In addition, such integral formation can fix support portions 37 and prevent warpage and deformation of luminance uniformity plate 24.

Note that support portion 37 is preferably provided on a portion of partition wall 331 which is other than four corners of partition walls 331 as in the first exemplary embodiment. In addition, support portion 37 is preferably provided on a substantially center portion of partition wall 331. Although support portions 37 are integrally formed with partition walls 331 of reflective sheet 33 in this exemplary embodiment, support portions 37 may be separately formed and disposed on upper center portions of partition walls 331.

Other Exemplary Embodiments

The first and second exemplary embodiments have been described above as examples of the technique disclosed in the present disclosure. However, the technique in the present disclosure is not limited to this and can also be applied to exemplary embodiments having undergone changes, replacements, additions, omissions, and the like as needed. In addition, new exemplary embodiments can be implemented by combining the respective constituent elements described above in the first and second exemplary embodiments.

Note that in the present disclosure, the size of each constituent element is merely an example but is not limited to the example.

In addition, in the second exemplary embodiment, support portions 37 are provided on upper center portions of several partition walls 331, but positions of support portions 37 are not limited to them. Like opening portion 232 in the first exemplary embodiment, opening portion may be provided in a portion, of at least one partition wall 331 of partition walls 331 in four directions, which is other than four corners.

INDUSTRIAL APPLICABILITY

The present disclosure may be applied to backlight devices and liquid crystal display devices including the backlight devices.

REFERENCE MARKS IN THE DRAWINGS 10 liquid crystal display device
11 liquid crystal panel
12 bezel
20 backlight device
21 light source
22 chassis
23, 33 reflective sheet
231, 331 partition wall
232 opening portion
233, 241 hole
234, 334 opening
235, 335 light-emitting region
24 luminance uniformity Plate
25 diffuser panel
26 optical element
27 support member
271, 371 first support portion
272, 372 second support portion
273 shield portion
274, 276, 376 fixing portion
275 snap fit
28 printed board
37 support portion

The invention claimed is:

1. A backlight device comprising:
a plurality of light sources arranged in a shape of a matrix;
a reflective sheet having partition walls arranged to surround each of the plurality of light sources in four directions and reflecting light emitted from the plurality of light sources, a region obtained by surrounding one of the plurality of light sources in four directions with the partition walls being a light-emitting region;
a luminance uniformity plate located above the reflective sheet and uniforming luminance of the light emitted from the plurality of light sources and light reflected by the reflective sheet; and
a support member supporting the luminance uniformity plate,
wherein the reflective sheet includes an opening portion in a portion, of at least one partition wall of the partition walls arranged in the four directions, which is other than four corners, the opening portion has a hole into which the support member is inserted,
the support member includes a snap fit inserted into the hole, a first fixing portion disposed on the hole, a shield portion disposed in the opening portion, a second fixing portion, and a first support portion supporting the luminance uniformity plate,
the shield portion reduces light leaking from the light-emitting region into an adjacent light-emitting region through the opening portion, and
the second fixing portion clips the luminance uniformity plate together with the first support portion.

2. The backlight device according to claim 1, wherein the opening portion is provided in a portion where a straight line connecting the light sources adjacent to each other intersects the partition wall.

3. The backlight device according to claim 1, further comprising a diffuser panel provided above the luminance uniformity plate and diffusing light exiting from the luminance uniformity plate,
wherein the support member includes a second support portion supporting the diffuser panel.

4. A liquid crystal display device comprising:
a liquid crystal panel; and
the backlight device defined in claim 1, which is located on a back side of the liquid crystal panel and has a size corresponding to the liquid crystal panel.

5. A liquid crystal display device comprising:
a liquid crystal panel; and
the backlight device defined in claim 2, which is located on a back side of the liquid crystal panel and has a size corresponding to the liquid crystal panel.

6. A liquid crystal display device comprising:
a liquid crystal panel; and
the backlight device defined in claim 3, which is located on a back side of the liquid crystal panel and has a size corresponding to the liquid crystal panel.

* * * * *